US007268298B2

(12) United States Patent
Asakura et al.

(10) Patent No.: US 7,268,298 B2
(45) Date of Patent: Sep. 11, 2007

(54) SHIELDED CABLE-GROUNDING STRUCTURE

(75) Inventors: Nobuyuki Asakura, Shizuoka (JP); Tadahisa Sakaguchi, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 11/289,320

(22) Filed: Nov. 30, 2005

(65) Prior Publication Data

US 2006/0128223 A1 Jun. 15, 2006

(30) Foreign Application Priority Data

Dec. 1, 2004 (JP) .......................... P2004-348769

(51) Int. Cl.
*H02G 15/02* (2006.01)

(52) U.S. Cl. .......................... 174/78; 439/98; 439/610

(58) Field of Classification Search .................. 439/98, 439/99, 92, 610; 174/78, 51
See application file for complete search history.

(56) References Cited

U.S. PATENT DOCUMENTS 6,150,611 A * 11/2000 Imai ............................ 174/78

FOREIGN PATENT DOCUMENTS

JP 10-270123 A 10/1998
JP 11-135167 A 5/1999

* cited by examiner

*Primary Examiner*—Javaid H. Nasri
(74) *Attorney, Agent, or Firm*—Sughrue Mion, PLLC

(57) ABSTRACT

In a structure for grounding a shielded cable, a braided wire is extended radially outwardly of core covering portions to form a flange portion, and an associated wire is connected to the flange portion by the use of sleeve members, thereby effecting the grounding.

5 Claims, 5 Drawing Sheets

SHIELDED CABLE-GROUNDING STRUCTURE

BACKGROUND OF THE INVENTION

1. Field of the Invention

This invention relates to a shielded cable-grounding structure for grounding a braided wire at an end of a shielded cable.

2. Related Art

There is known one conventional shielded cable-grounding structure in which one side portion, extending from a shielding terminal, is placed on an insulating sheath, and a resin chip is laid on the one side portion extending from the shielding terminal, and in this condition ultrasonic vibration is applied to fuse and dissipate at least the relevant portion of the insulating sheath, thereby forming a shielding conducting portion at which the one side portion, extending from the shielding terminal, is electrically connected to a braided wire of the shielded cable (see, for example, JP-A-11-135167).

There is known another conventional shielded cable-grounding structure in which a shielding layer of a shielded cable is turned back on an outer periphery of an insulating sheath at an end portion of the shielded cable, and the turned-back shielding layer and the insulating sheath are press-fastened by a barrel of a metallic shell in such a manner that claws of the barrel extend through the shielding layer, and bite into the insulating sheath (see, for example, JP-A-10-270123).

In the above JP-A-11-135167, however, an end portion of a lead wire is placed on the insulating sheath, and the resin chip is laid on this end portion, and in this condition the shielded cable, together with the lead wire end portion and the resin chip, is held between a pair of ultrasonic horns, and ultrasonic vibration is applied to this portion while applying a pressure from the upper side of the resin chip. Therefore, there is a fear that a large load is applied to the braided wire and a core portion to damage them.

In the above JP-A-10-270123, the claws of the barrel are brought into biting engagement with the shielding layer, and therefore there is a fear that the shielding layer is damaged.

Usually, it is desired that a braided wire of such a shielded cable is woven into a mesh-like structure, and covers an entire periphery of a signal conductor over an entire length thereof so as to form a positive grounding circuit so that disturbance noises will not reach the signal conductor.

In a conventional shielded cable-grounding structure shown in FIG. 7, however, a sheath 51 is peeled and removed from an end portion of a shielded cable 50, and an end portion of a conductor 53 is exposed by separating a braided wire 52 therefrom, and a distal end portion of the conductor 53 is peeled, and is press-connected to a terminal 54. The braided wire 52, separated from the conductor 53, is twisted, and a tape is wound on the twisted braided wire 52, or a shrinkable tube is fitted on the twisted braided wire 52, and a distal end portion of the braided wire 52 is cut off for trimming purposes, and the trimmed end portion of the braided wire 52 is press-connected to a terminal 55. Therefore, the efficiency of the operation is low, and besides since the exposed braided wire 52 is twisted to assume a generally linear configuration, a disturbance-intercepting capacity is reduced, so that there is a fear that the effect of shielding the exposed conductor 53 is lowered. On the other hand, the exposed conductor 53 (which is separated from the braided wire 52, and extends to the terminal 54), has a non-shielded portion or region which is not covered with the braided wire 52, and is to be received within a connector. Furthermore, much time and labor have been required for the additional operations (including the operation for trimming the distal end) for the braided wire 52.

SUMMARY OF THE INVENTION

This invention has been made in view of the above circumstances, and an object of the invention is to provide a shielded cable-grounding structure in which the efficiency of a grounding can be enhanced, and besides a noise-intercepting performance can be enhanced.

1) A shielded cable-grounding structure for grounding a shielded cable comprising a core portion comprising a conductor, a core covering portion covering the core portion, a braided wire provided around the core covering portion, and a resin insulating sheath provided around the braided wire to cover the core portion, the core covering portion and the braided wire; characterized in that the braided wire is extended radially outwardly of the core covering portion to form a flange portion, and a wire is connected to the flange portion through a sleeve at an outer periphery of the insulating sheath, thereby effecting a grounding.

In the shielded cable-grounding structure of the above Paragraph 1), the sleeve electrically connects the wire to the flange portion of the braided wire (extended radially outwardly of the core covering portion) at the outer periphery of the insulating sheath, and therefore does not apply a large load to the braided wire and the core portion, and therefore will not damage or cut them, so that the quality can be maintained. And besides, the flange portion of the braided wire, extended radially outwardly of the core covering portion, is formed into a flange-like shape, and therefore a shielding capacity is not reduced, so that a positive grounding circuit can be formed. Furthermore, the braided wire is electrically connected to the wire without requiring an additional operation such as trimming, and therefore the efficiency of the operation can be enhanced. Therefore, the efficiency of the grounding can be enhanced, and also a noise-intercepting performance can be enhanced.

2) The shielded cable-grounding structure of the above Paragraph 1) is further characterized in that the sleeve comprises a first sleeve member provided between the flange portion and the insulating sheath, and a second sleeve member provided around an outer periphery of the flange portion; and the wire is inserted between one of the first and second sleeve members and the flange portion, and is connected thereto, thereby effecting the grounding.

In the shielded cable-grounding structure of the above Paragraph 2), the first sleeve member is electrically connected at the outer periphery of the insulating sheath to an inner peripheral surface of the flange portion of the braided wire (extended radially outwardly of the core covering portion) with a large area of contact therebetween obtained, while the second sleeve member is electrically connected to an outer peripheral surface of the flange portion, with a large area of contact therebetween obtained. Therefore, the shielding capacity is not reduced, so that the positive grounding circuit for the wire can be formed.

3) A shielded cable-grounding structure for grounding a shielded cable comprising a core portion comprising a conductor, a core covering portion covering the core portion, a braided wire provided around the core covering portion, and a resin insulating sheath provided around the braided wire to cover the core portion, the core covering portion and the braided wire; characterized in that the braided wire is extended radially outwardly of the core covering portion to form a flange portion, and a first sleeve member is provided on an outer periphery of the insulating sheath to be disposed between the flange portion and the core covering portion, and a second sleeve member is fitted on an outer periphery of the flange portion, and an wire is inserted between one of the first and second sleeve members and the flange portion, and is connected thereto, thereby effecting a grounding.

In the shielded cable-grounding structure of the above Paragraph 3), the first sleeve member is electrically connected at the outer periphery of the insulating sheath to an inner peripheral surface of the flange portion of the braided wire (extended radially outwardly of the core covering portion) with a large area of contact therebetween obtained, while the second sleeve member is electrically connected to an outer peripheral surface of the flange portion, with a large area of contact therebetween obtained. Therefore, a shielding capacity is not reduced, so that the positive grounding circuit for the wire can be formed. And besides, a large load is not applied to the braided wire and the core portion, and therefore the quality of the connected portion can be maintained. Furthermore, the braided wire is electrically connected to the wire without requiring an additional operation such as trimming, and therefore the efficiency of the operation can be enhanced. Therefore, the efficiency of the grounding can be enhanced, and also the noise-intercepting performance can be enhanced.

In the shielded cable-grounding structure of the present invention, a large load is not applied to the braided wire and the core portion, and the efficiency of the grounding is enhanced, and also the noise-intercepting performance is enhanced, thereby achieving an advantage that the shielded cable of high quality can be obtained.

The flange portion may be formed by folding back a middle part of the braided wire. By such a structure, the braided wire can cover the core portion and the core covering portion on a distal end side of the shield cable with respect to the flange portion. As a result, a disturbance-intercepting capacity is secured, so that the shielding effect to the conductor is assuredly obtained.

DETAILED DESCRIPTION OF THE PREFERRED EMBODIMENTS

A plurality of preferred embodiments of the present invention will now be described in detail with reference to the drawings.

First Embodiment

Figure 1:
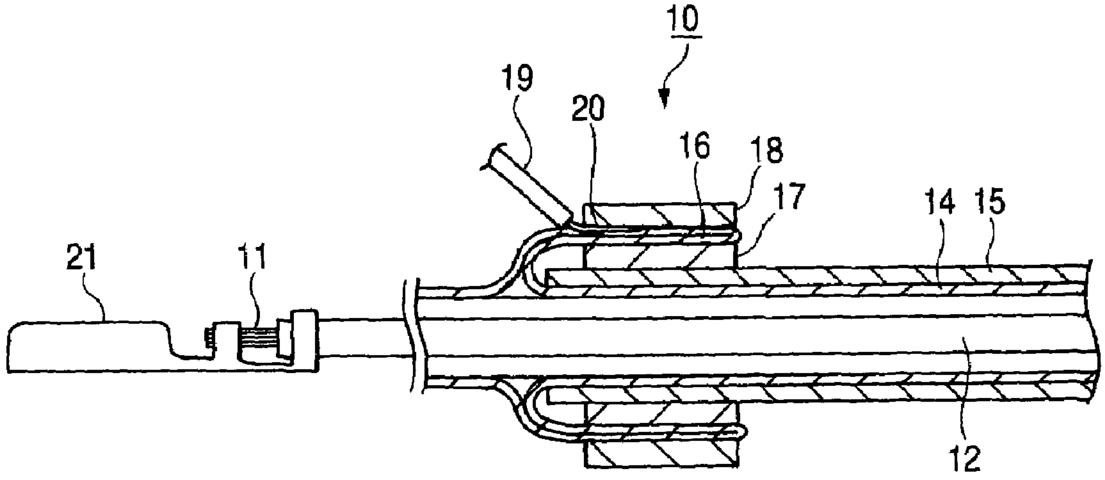
FIG. 1 is a cross-sectional view of a shielded cable prepared, using a first embodiment of a shielded cable-grounding structure of the present invention.
Figure 2:
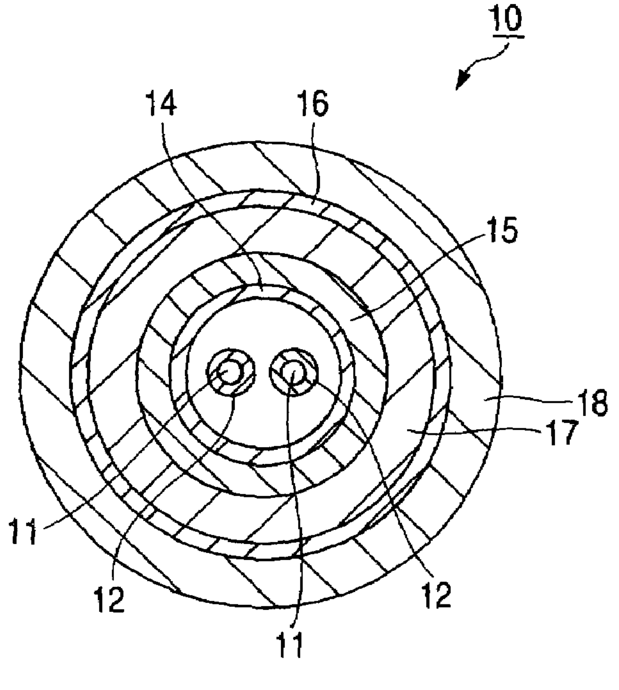
FIG. 2 is a cross-sectional view of the shielded cable of FIG. 1.
Figure 3:
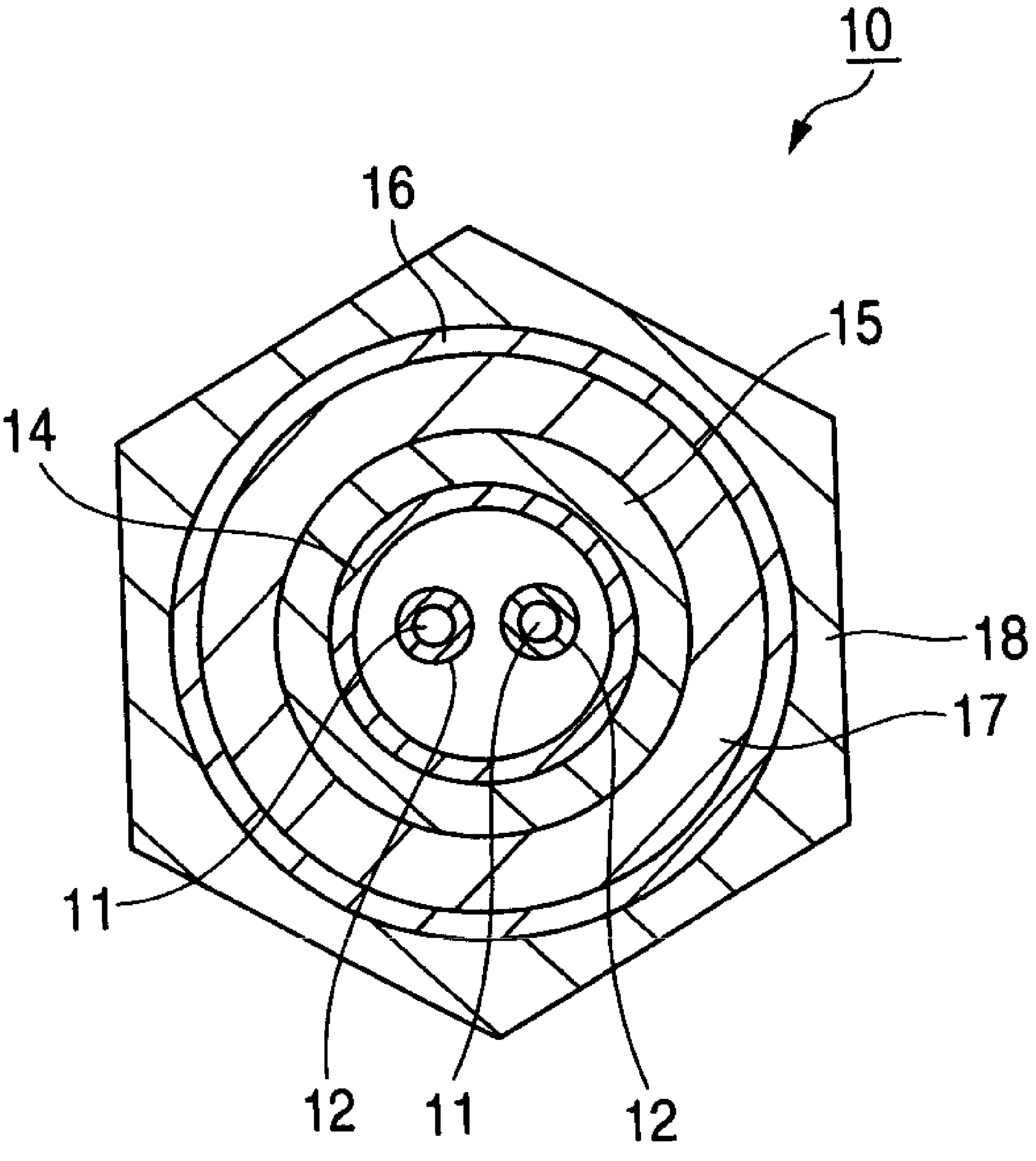
FIG. 3 is a cross-sectional view of a modified example of the shielded cable-grounding structure of FIG. 2.
Figure 4:
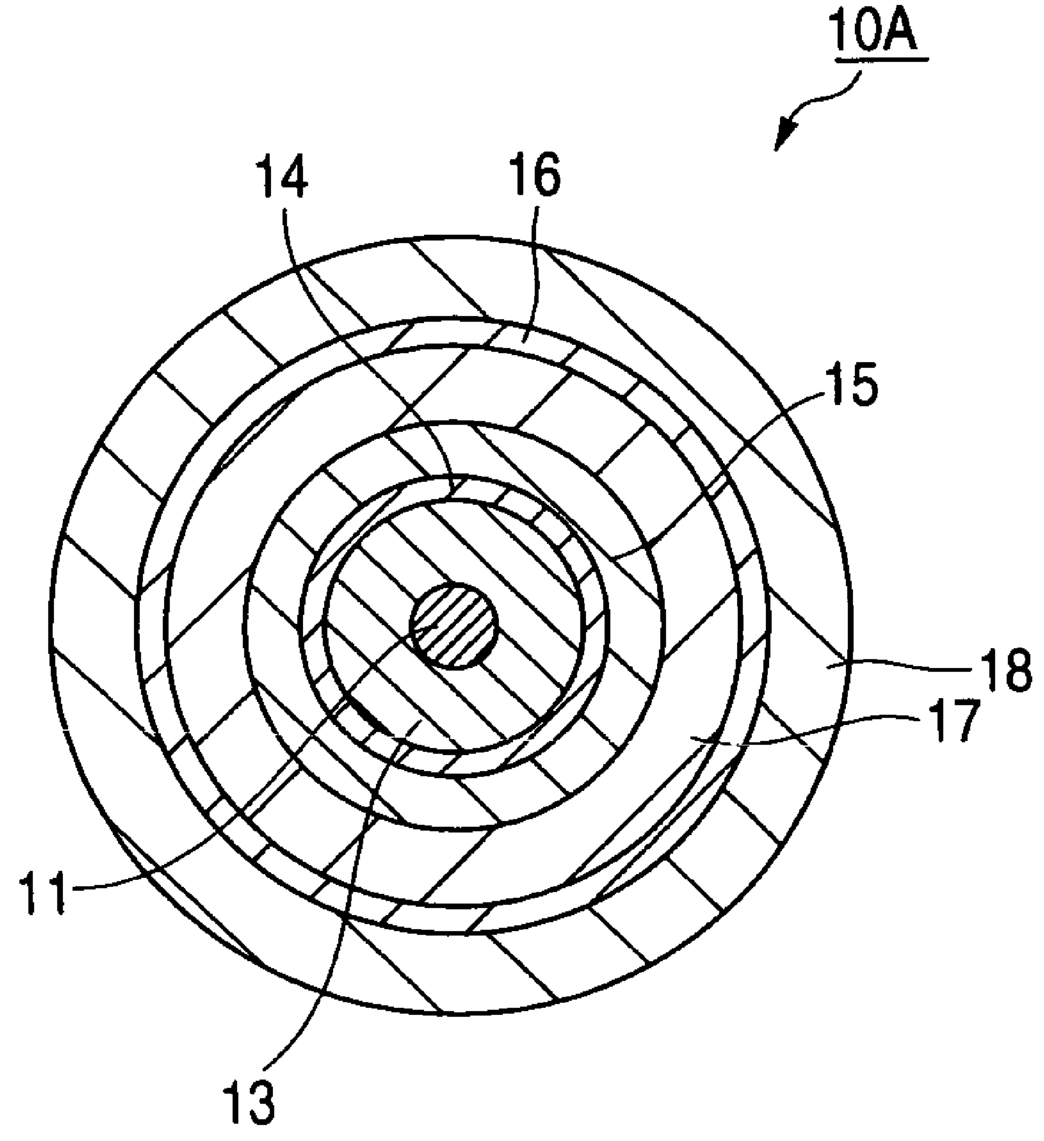
FIG. 4 is a cross-sectional view of another form of shielded cable.

FIG. 1 is a cross-sectional view of a shielded cable prepared, using a first embodiment of a shielded cable-grounding structure of the invention, FIG. 2 is a cross-sectional view of the shielded cable of FIG. 1, FIG. 3 is a cross-sectional view of a modified example of the shielded cable-grounding structure of FIG. 1, and FIG. 4 is a cross-sectional view of another form of shielded cable.

As shown in FIG. 1, the shielded cable 10, incorporating the first embodiment of the shielded cable-grounding structure of the invention, comprises a pair of core portions 11 (each comprising a conductor), core covering portions 12 covering the core portions 11, respectively, a braided wire 14 provided around the pair of core covering portions 12, and a resin insulating sheath 15 provided around an outer periphery of the braided wire 14 to cover the core portions 11, the core covering portions 12 and the braided wire 14.

A first feature of the shielded cable 10 resides in the fact that the braided wire 14 is extended radially outwardly of the insulating sheath 15 to form a flange portion 16. This flange portion 16 is formed into a flange-like shape, that is, into a cylindrical shape, and is disposed around the outer periphery of the insulating sheath 15, and therefore an overall surface area is not reduced, and therefore the flange portion maintains a large shielding capacity, and contributes to the formation of a positive grounding circuit.

The flange portion 16 is formed by folding back a middle part of the braided wire 14. Therefore, the braided wire 14 covers the core portions 11 and the core covering portions 12 on a distal end side of the shield cable 10 with respect to the flange portion 16.

A second feature of the shielded cable 10 resides in the fact that a first sleeve member 17 and a second sleeve member 18 are electrically connected to the flange portion 16 of the braided wire 14.

The first sleeve member 17 is made of an electrically-conductive material, and is formed into a cylindrical shape, and has a predetermined outer diameter and an inner diameter slightly larger than the outer diameter of the insulating sheath 15. In a production process, the first sleeve member 17 is mounted on the insulating sheath 15 before the flange portion 16 of the braided wire 14 is formed, and the flange portion 16, arranged radially outwardly of the insulating sheath 15, is fitted on the first sleeve member 17. The first sleeve member 17 is generally equal in length to the flange portion 16, and therefore is electrically connected to an inner peripheral surface of the flange portion 16 in such a manner that a large area of contact between the two is obtained.

The second sleeve member 18 is made of an electrically-conductive material, and is formed into a cylindrical shape, and has a predetermined outer diameter and an inner diameter larger than the outer diameter of the first sleeve member 17. In the production process, the second sleeve member 18, together with a conductor 20 of an associated wire 19 (connected to a grounding circuit) is mounted on the outer periphery of the flange portion 16 fitted on the first sleeve member 17. The second sleeve member 18 is generally equal in length to the flange portion 16, and therefore is electrically connected to the outer peripheral surface of the flange portion 16 in such a manner that a large area of contact between the two is obtained.

After the first sleeve member 17 and the second sleeve member 18 are mounted on the shielded cable 10, that portion of the shielded cable 10, having the first and second sleeve members 17 and 18 mounted thereon, is drawn by swaging such that the outer peripheral surface of the second sleeve member 18 is formed into a circular cross-section as shown in FIG. 2. As a result, the inner peripheral surface of the flange portion 16 of the braided wire 14 is electrically connected to the first sleeve member 17, with the large area of contact therebetween obtained, while the outer peripheral surface of the flange portion 16, together with the conductor 20 of the associated wire 19, is electrically connected to the second sleeve member 18 in such a manner that the large area of contact between the flange portion 16 and the second sleeve member 18 is obtained. At this time, the swaged first and second sleeve members 17 and 18 do not apply a large load to the insulating sheath 15, the braided wire 14 and the core covering portions 12, and therefore will not damage or cut the braided wire 14 and the core portions 11.

The shielded cable 10 of the above construction is produced by the following process.

First, the insulating sheath 15 is cut and removed at a predetermined portion of the shielded cable, and the braid wire 14 is extended radially outwardly of the insulating sheath 15 to form the flange portion 16. Terminals 21 are press-connected respectively to the end portions of the core portions 11 from which the insulating sheath 15 has been removed.

Then, the first sleeve member 17 is inserted into the flange portion 16 of the braided wire 14, and the second sleeve member 18 is mounted on the outer periphery of the flange portion 16, and the first and second sleeve members 17 and 18, together with the conductor 20 of the associated wire 19, is subjected to the swaging operation. As a result, the first and second sleeve members 17 and 18 are electrically connected to the flange portion 16 (having the large area) in such a manner that the large area of contact between each of the first and second sleeve members 17 and 18 and the flange portion 16 is obtained, and also the conductor 20 of the associated wire 19 is electrically connected to the second sleeve member 18 electrically connected to the flange portion 16 with the large area of contact therebetween obtained. At this time, the core portions 11 are electrically connected respectively to the terminals 21 in such a manner that a non-shielded region of each core portion 11 is small.

Next, the modified example of the shielded cable 10 will be described with reference to FIG. 3. In this modified example, a hexagonal pressing operation is used. After the first sleeve member 17 and the second sleeve member 18 are mounted on the shielded cable 10, that portion of the shielded cable 10, having the first and second sleeve members 17 and 18 mounted thereon, is pressed by the hexagonal pressing operation such that the outer peripheral surface of the second sleeve member 18 is formed into a hexagonal cross-section. As a result, the inner peripheral surface of the flange portion 16 of the braided wire 14 is electrically connected to the first sleeve member 17, with a large area of contact therebetween obtained, while the outer peripheral surface of the flange portion 16, together with the conductor 20 of the associated wire 19, is electrically connected to the second sleeve member 18 in such a manner that a large area of contact between the flange portion 16 and the second sleeve member 18 is obtained. At this time, the first and second sleeve members 17 and 18, pressed by the hexagonal pressing operation, do not apply a large load to the insulating sheath 15, the braided wire 14, the core covering portions 12 and the core portions 11, and therefore will not damage or cut the braided wire 14 and the core portions 11. And besides, the outer peripheral surface of the second sleeve member 18 is formed into the hexagonal shape, and therefore the second sleeve member 18 performs a rotation prevention function when the shielded cable is inserted into a connector (not shown).

As described above, in the shielded cable-grounding structure of this embodiment, the first sleeve member 17 is electrically connected to the inner peripheral surface of the flange portion 16 of the braided wire 14 (arranged around the outer periphery of the insulating sheath 15), with the large area of contact therebetween obtained, while the second sleeve member 18 is electrically connected to the outer peripheral surface of the flange portion 16 with the large area of contact therebetween obtained. Therefore, the positive grounding circuit for the associated wire 19 can be formed without reducing the shielding capacity. And besides, the first and second sleeve members do not apply a large load to the braided wire 14 and the core portions 11, and therefore will not damage or cut them, so that the quality of the shielded cable can be maintained. Furthermore, the braided wire 14 is electrically connected to the conductor 20 of the associated wire 19 without requiring an additional operation such as trimming, and therefore the efficiency of the operation can be enhanced. Furthermore, each of the core portions 11 has the small non-shielded region, and therefore the shielding effect can be obtained for the core portions 11 over a wide range. Thanks to these advantageous effects, the efficiency of the grounding can be enhanced, and besides the noise-intercepting performance can be enhanced. Furthermore, the second sleeve member 18 is formed to have the uniform outer diameter by the swaging operation or the hexagonal pressing operation, and therefore the good disturbance-intercepting performance can be obtained, so that the shielded cable is less liable to be affected by noises.

Although the shielded cable-grounding structure of this embodiment is applied to the shielded cable having the pair of core portions, it can be applied also to a shielded cable having a single core portion. Namely, such a shielded cable 10A, shown in FIG. 4, comprises a core portion 11 comprising a single conductor), an inner insulating layer 13 covering the core portion 11, a braided wire 14 provided around the inner insulating layer 13, and an insulating sheath 15 provided around an outer periphery of the braided wire 14. The grounding structure is the same as that of the first embodiment, and therefore explanation thereof is omitted here.

Second Embodiment

Next, a second embodiment of a shielded cable-grounding structure of the invention will be described with reference to FIGS. 5 and 6. Those constituent elements and so on, corresponding to those of the shielded cable 10 described above, will be designated by identical or like reference numerals, respectively, and explanation thereof will be simplified or omitted.

Figure 5:
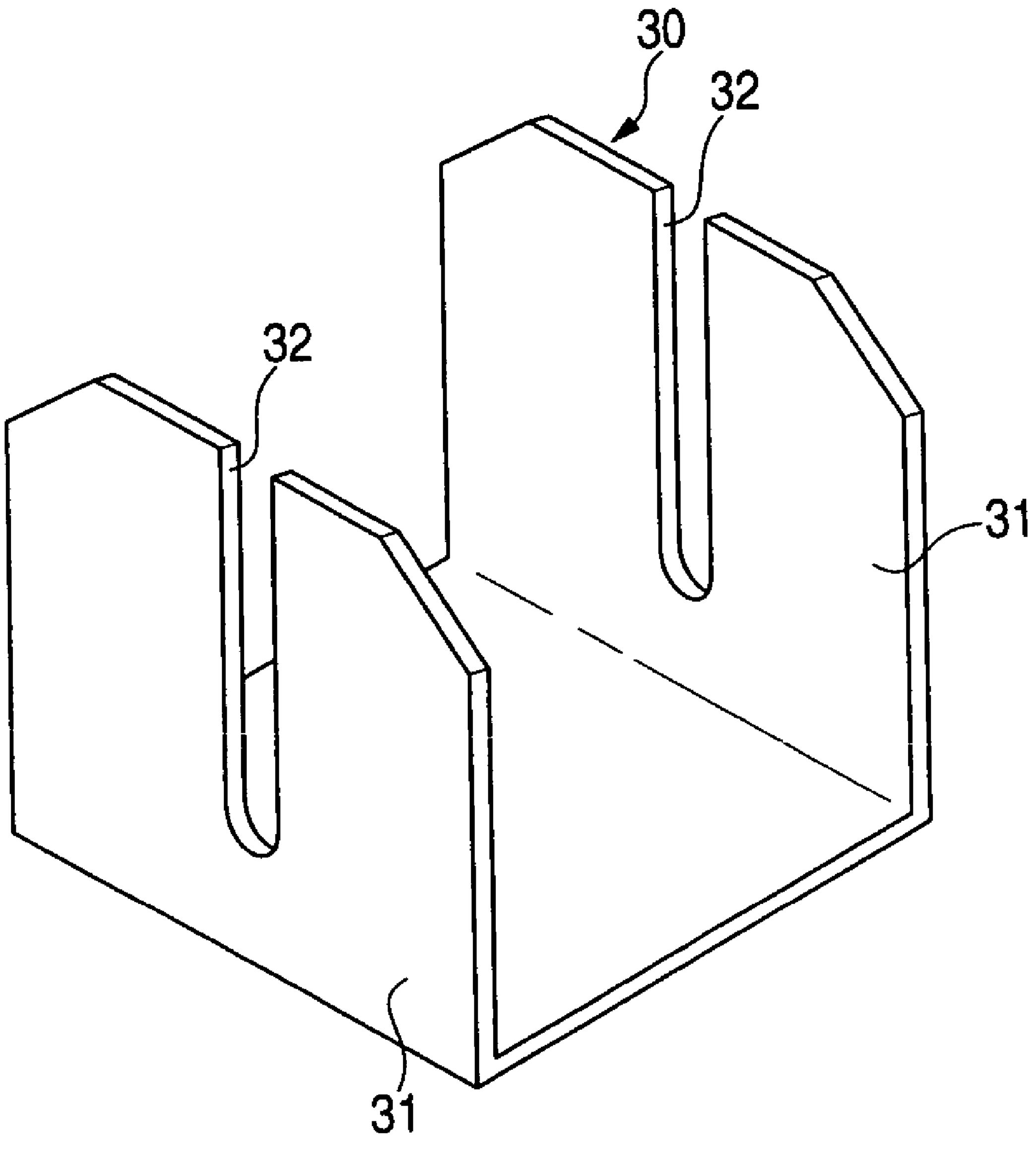
FIG. 5 is a perspective view of a sleeve used in a second embodiment of a shielded cable-grounding structure of the invention.
Figure 6:
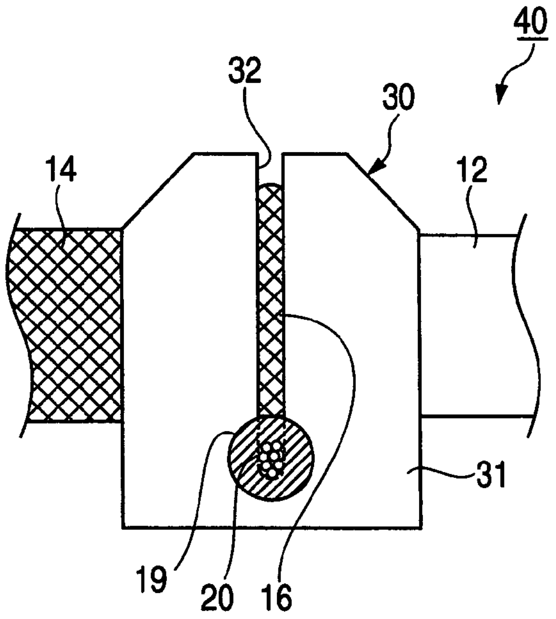
FIG. 6 is a side-elevational view of a shielded cable having the sleeve of FIG. 5 mounted thereon.
Figure 7:
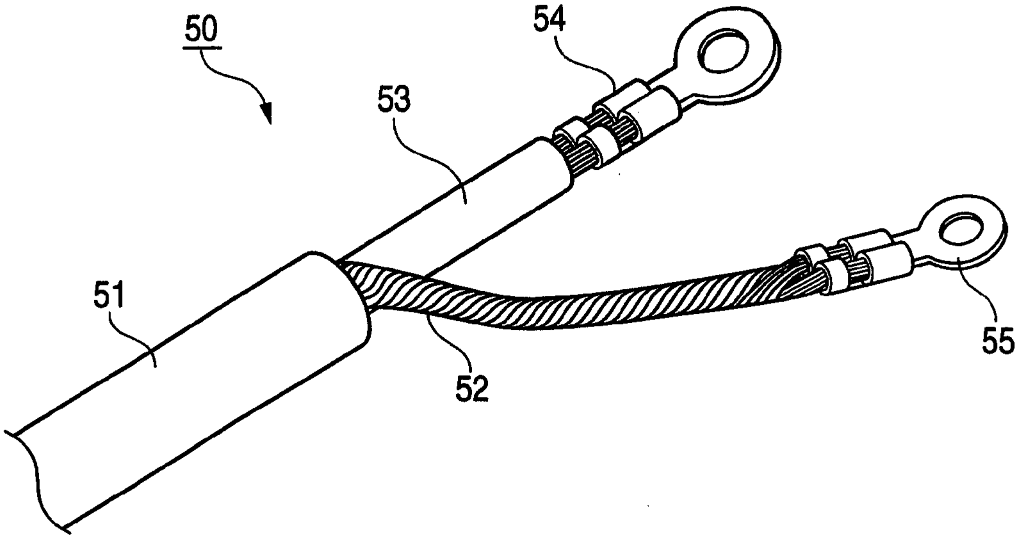
FIG. 7 PRIOR ART
FIG. 7 is a view of a conventional shielded cable, showing its appearance.

FIG. 5 is a perspective view of a sleeve used in the second embodiment of the shielded cable-grounding structure of the invention, and FIG. 6 is a side-elevational view of a shielded cable having the sleeve of FIG. 5 mounted thereon.

As shown in FIG. 5, the sleeve 30, used in the second embodiment of the shielded cable-grounding structure of the invention, is made of an electrically-conductive material, and is formed into a generally U-shape. This sleeve 30 has slit-like press-contacting blades 32 and 32 formed respectively in upper edges of a pair of opposed side plates 31 and 31.

As shown in FIG. 6, in the shielded cable 40 prepared using the sleeve 30, the sleeve 30 is brought into registry with a flange portion 16 of a braided wire 14 extended radially outwardly of a pair of core covering portions 12. Then, the flange portion 16 and a conductor 20 of an associated wire 19 are press-fitted into the press-contacting blades 32 and 32. Each of the press-contacting blades 32 and 32 has a gap smaller than combined widths of the flange portion 16 and conductor 20, and therefore when the flange portion 16 and the conductor 20 of the associated wire 19 are press-fitted into the press-contacting blades 32 and 32, the press-contacting blades 32 and 32 are press-contacted with the flange portion 16 and the conductor 20, and therefore are electrically connected thereto.

In the shielded cable-grounding structure of this embodiment, the sleeve 30 electrically connects the conductor 20 of the associated wire 19 to the flange portion 16 of the braided wire 14 extended radially outwardly of an insulating sheath 15, and therefore the sleeve does not apply a large load to the braided wire 14 and core portions 11, and therefore will not damage or cut the braided wire 14 and the core portions 11, so that the quality can be maintained. And besides, the flange portion 16 of the braided wire 14, extended radially outwardly of the insulating sheath 15, is formed into a flange-like shape, and therefore a shielding capacity is not reduced, so that a positive grounding circuit can be formed. Furthermore, the braided wire 14 is electrically connected to the conductor 20 of the associated wire 19 without requiring an additional operation such as trimming, and therefore the efficiency of the operation can be enhanced. Therefore, the efficiency of the grounding can be enhanced, and besides a noise-intercepting performance can be enhanced.

The invention is not limited to the above embodiments, and suitable modifications, improvements and soon can be made. For example, although each of the first and second sleeve members, used in the first embodiment, has the cylindrical shape, they can have a polygonal shape.

A connection terminal can be formed integrally with the sleeve used in the second embodiment, and with this construction a grounding circuit can be formed in other circuit via the connection terminal.

What is claimed is:

1. A shielded cable-grounding structure for grounding a shielded cable comprising:

a core portion provided with a conductor;

core covering portion covering said a core portion;

a braided wire provided around said core covering portion; and a resin insulating sheath provided around said braided wire to cover said core portion, said core covering portion and said braided wire;

wherein said braided wire is extended radially outwardly to form a flange portion disposed around said insulating sheath, and a ground wire is connected to said flange portion by attaching a sleeve to the flange portion, thereby affecting a grounding.

2. A shielded cable-grounding structure according to claim 1, wherein said sleeve comprises a first sleeve member provided between said flange portion and said insulating sheath, and a second sleeve member provided around an outer periphery of said flange portion; and said wire is inserted between one of said first and second sleeve members and said flange portion, and is connected thereto, thereby effecting the grounding.

3. A shielded cable-grounding structure according to claim 1, wherein said flange portion is formed by folding back a middle part of said braided wire.

4. A shielded cable-grounding structure according to claim 1, wherein said braided wire covers said core portion and said core covering portions on a distal end side of said shield cable with respect to said flange portion.

5. A shielded cable-grounding structure for grounding a shielded cable comprising:

a core portion provided with a conductor;

core covering portion covering said a core portion;

a braided wire provided around said core covering portion; and a resin insulating sheath provided around said braided wire to cover said core portion, said core covering portion and said braided wire;

wherein said braided wire is extended radially to form a flange portion, and a wire is connected to said flange portion around said insulating sheath by attaching a sleeve to the flange portion, thereby effecting a grounding, wherein said sleeve comprises a first sleeve member provided between said flange portion and said insulating sheath, and a second sleeve member provided around an outer periphery of said flange portion; and said wire is inserted between one of said first and second sleeve members and said flange portion, and is connected thereto, thereby affecting the grounding.

* * * * *